(12) United States Patent
Jacobsen et al.

(10) Patent No.: US 8,721,829 B2
(45) Date of Patent: May 13, 2014

(54) METHOD OF CUTTING OFF LAMINATE LAYERS, EG A GLASS FIBRE OR CARBON-FIBRE LAMINATE LAYER IN THE BLADE OF A WIND TURBINE

(75) Inventors: Torben Krogsdal Jacobsen, Lunderskov (DK); Morten Dahl, Kolding (DK)

(73) Assignee: LM Glasfiber A/S, Lunderskov (DK)

( * ) Notice: Subject to any disclaimer, the term of this patent is extended or adjusted under 35 U.S.C. 154(b) by 1140 days.

(21) Appl. No.: 11/660,122

(22) PCT Filed: Aug. 10, 2005

(86) PCT No.: PCT/DK2005/000522
§ 371 (c)(1),
(2), (4) Date: Apr. 9, 2007

(87) PCT Pub. No.: WO2006/015598
PCT Pub. Date: Feb. 16, 2006

(65) Prior Publication Data
US 2008/0145615 A1     Jun. 19, 2008

(30) Foreign Application Priority Data

Aug. 13, 2004 (DK) .................................. 2004 01225

(51) Int. Cl.
*B32B 38/08* (2006.01)
*B32B 38/10* (2006.01)
*B26D 3/02* (2006.01)

(52) U.S. Cl.
USPC ........ 156/250; 156/278; 156/304.5; 156/305; 83/13; 83/29

(58) Field of Classification Search
USPC ........ 428/60, 156, 172, 192; 416/229 R, 230, 416/240; 156/250, 256, 266, 304.5, 278, 156/305; 83/13, 29, 425.2
See application file for complete search history.

(56) References Cited

U.S. PATENT DOCUMENTS 1,875,597 A * 9/1932 Heath ............................ 416/230
3,388,932 A * 6/1968 Bradley ........................ 285/332
(Continued)

FOREIGN PATENT DOCUMENTS

DK    154 906    1/1989
EP    1050396    4/1999
(Continued)

OTHER PUBLICATIONS

European Patent Office, Letter from the Opponent, dated Jun. 26, 2012, mailed Jul. 2, 2012, one (1) page.

(Continued)

*Primary Examiner* — Donald J Loney
(74) *Attorney, Agent, or Firm* — Nath, Goldberg & Meyer; Jerald L. Meyer; Sanjana Mangalagiri

(57) ABSTRACT

The invention relates to a method of cutting off laminate layers for use in a fiber-reinforced laminate object comprising a number of combined laminate layers, wherein, along a section of the at least one rim of the laminate layer, a tapering cut is performed through the thickness of the laminate layer, whereby the thickness of the laminate layer is reduced. Since not only the number of laminate layers, but also the thickness of the individual laminate layers are reduced, a laminate layer is accomplished that can be used in a laminate object, by which both the issues of areas rich in resin, air pockets and the risk of delamination are reduced. The invention also relates to a laminate layer for use in a fiber-reinforced laminate object comprising a number of combined laminate layers and a fiber-reinforced laminate object in the form of the blade of a wind turbine, wherein the blade of the wind turbine comprises a number of combined laminate layers.

8 Claims, 4 Drawing Sheets

(56) References Cited

U.S. PATENT DOCUMENTS

| | | | | |
|---|---|---|---|---|
| 4,015,035 A * | 3/1977 | Blad et al. | | 428/60 |
| 5,069,101 A | 12/1991 | Kleemola | | |
| 5,281,454 A * | 1/1994 | Hanson | | 428/36.3 |
| 5,531,316 A * | 7/1996 | Savino | | 198/844.2 |
| 5,618,604 A | 4/1997 | Dohn | | |
| 5,698,358 A * | 12/1997 | Yu | | 430/127 |
| 5,991,987 A | 11/1999 | Olry et al. | | |
| 6,273,830 B1 * | 8/2001 | Takemura et al. | | 473/319 |
| 2002/0148555 A1 | 10/2002 | Vigder | | |

FOREIGN PATENT DOCUMENTS

| | | |
|---|---|---|
| GB | 1 536 899 | 12/1978 |
| GB | 2 310 822 A | 9/1997 |
| JP | 05-057829 A | 3/1993 |
| JP | 081 054 28 | 4/1996 |
| WO | 03/008800 A1 | 1/2003 |
| WO | WO 03/068 494 | 8/2003 |
| WO | 03/078832 A1 | 9/2003 |
| WO | WO 03/078 833 | 9/2003 |
| WO | 2004/078461 A1 | 9/2004 |
| WO | 2012/013192 A1 | 2/2012 |
| WO | 2012/013193 A2 | 2/2012 |
| WO | 2012/013194 A1 | 2/2012 |

OTHER PUBLICATIONS

Witness Statement, Professor Kevin Potter, of University of Bristol, dated Jun. 25, 2012, one (1) page.
Witness Statement, Anton Bech, of Vestas Wind Systems A/S, dated Jun. 26, 2012, one (1) page.
European Patent Office, Letter from the Opponent, dated Jun. 11, 2012, mailed Jun. 15, 2012, one (1) page.
European Patent Office, Letter from the proprietor of the patent, dated Jun. 8, 2012, mailed Jun. 13, 2012, one (1) page.
European Patent Office, Submission in Opposition Proceedings, Patent No. EP1786617, dated Jun. 11, 2012, three (3) pages.
Maheri, "An Improved Method for Testing Uniderctional FRP Composites in Tension," Composite Structures, (1995), vol. 33, pp. 27-34.
Griffin, "Blade System Design Studies," Sand Report, (2002), vol. 1, sixty (60) pages.
Khan, et al., "Scaling Effects in Notched Composites (SINCS)," University of Bristol Department of Aerospace Engineering, (2004), twenty-two (22) pages.
Email between Magnus Holmberg & Professor Michael Wisnom, dated May 17, 2012, two (2) pages.
Scott, "Effects of Ply Drops on the Fatigue Resistance of Composite Materials and Structures," Thesis Submitted at Montana State University, (1997), one-hundred and forty-one (141) pages.

URL: http://www.eirecomposites.com/wind-energy-composites-materials-manufacturing-and-prototyping.html, last visited Jun. 11, 2012, two (2) pages.
Opposition Against European Patent No. EP 1786617, Letter addressed to European Patent Office, dated Jun. 11, 2012, twelve (12) pages.
Auxiliary Requests, European Patent No. 1 786 617 B1, twenty-four (24) pages.
European Patent Office, Submission in opposition proceedings, dated Jun. 8, 2012, two (2) pages.
Opposition Against EP 1 786 617 B1, letter addressed to European Patent Office, dated Jun. 8, 2012, two (2) pages.
European Patent Office, Letter from the Opponent, dated May 22, 2012, mailed May 25, 2012, one (1) page.
European Patent Office, Letter from the proprietor of the patent, dated Mar. 21, 2012, mailed Mar. 27, 2012, one (1) page.
European Patent Office, Submission in Opposition Proceedings, Interpreting Requested in English, dated Mar. 21, 2012, two (2) pages.
European Patent Office, Request of Oral Proceedings, dated Mar. 15, 2012, five (5) pages.
European Patent Office, Communication of Amended Entries Concerning the Representative, dated Jan. 18, 2012, one (1) page.
European Patent Office, Letter from the Opponent, dated Jul. 7, 2011, mailed Jul. 19, 2011, one (1) page.
European Patent Office, Letter from the proprietor of the patent, dated Apr. 14, 2011, mailed Apr. 26, 2011, one (1) page.
European Patent Office, Submission in Opposition Proceedings, dated Apr. 14, 2011, one (1) page.
Proprietor's Requests and Observations, letter addressed to European Patent Office, dated Apr. 14, 2011, six (6) pages.
European Patent Office, Submission in Opposition Proceedings, 2 Month Extension of Time Requested, dated Feb. 11, 2011, one (1) page.
European Patent Office, Communication of Notices of Opposition, dated Oct. 14, 2010, two (2) pages.
European Patent Office, Communication of a Notice of Opposition, dated Sep. 21, 2010, one (1) page.
Niu, "Composite Airframe Structures Practical Design Information and Data," Hong Kong Conmilit Press Ltd., (1992), seven (7) pages.
Lee, "Excerpts from Dictionary of Composite Materials," CRC Press, (1989), one (1) page.
European Patent Office, Notice of Opposition to a European Patent, Patent opposed EP 1 786 617, dated Sep. 10, 2010, five (5) pages.
Opposition by Vestas Wind Systems A/S, letter to European Patent Office, dated Sep. 9, 2010, eleven (11) pages.

* cited by examiner

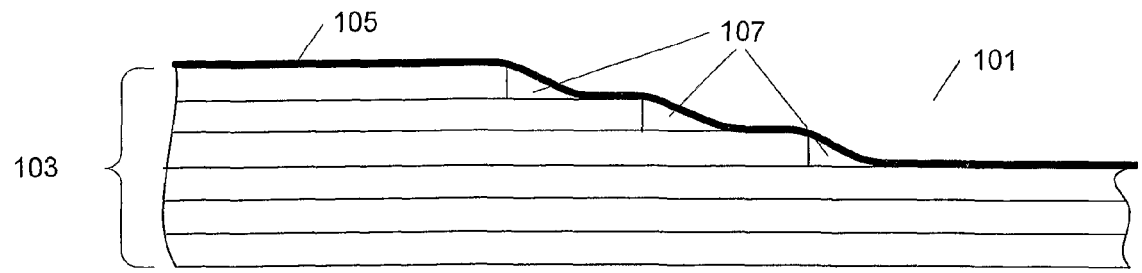
Fig. 1 (Prior art)
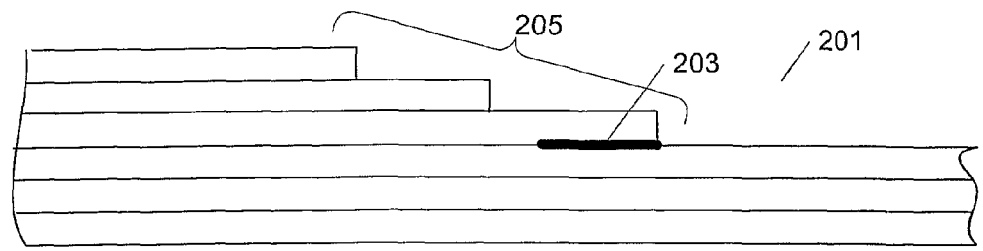
Fig. 2 (Prior art)
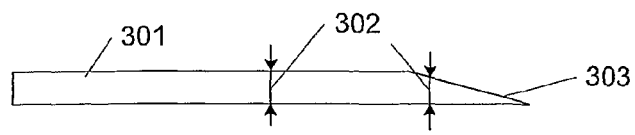
Fig. 3
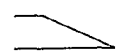 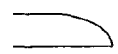  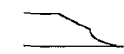 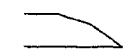 
Fig. 4A  Fig. 4B  Fig. 4C  Fig. 4D  Fig. 4E  Fig. 4F
    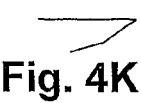 
Fig. 4G  Fig. 4H  Fig. 4I  Fig. 4J  Fig. 4K  Fig. 4L
Fig. 4M

METHOD OF CUTTING OFF LAMINATE LAYERS, EG A GLASS FIBRE OR CARBON-FIBRE LAMINATE LAYER IN THE BLADE OF A WIND TURBINE

The invention relates to a method of cutting off laminate layers for use in a fibre-reinforced laminate object comprising a number of combined laminate layers. Moreover the invention relates to a laminate layer for use in a fibre-reinforced laminate object comprising a number of combined laminate layers. Finally the invention also relates to a fibre-reinforced laminate object in the form of the blade of a wind turbine, wherein said blade of a wind turbine comprises a number of combined laminate layers.

Laminates are used for a wide variety of different objects, wherein a laminate object is composed of a number of combined laminate layers.

One example of an object composed of laminate layers is a glass-fibre object, wherein, typically, a number of laminate layers in the form of glass-fibre webs are arranged atop each other, and wherein the number of laminate layers depends on the properties desired for the laminate object. In connection with glass fibre objects resin is used for keeping the layers together. The resin may be applied manually onto the laminate layers by RTM (resin transfer moulding), VARTM (vacuum assisted resin transfer moulding) or any other suitable method. Alternatively the resin may be applied onto the laminate layers prior to laying of the layers (Prepreg). In case it is desired to have an object that varies in thickness and changes from thick to more thin, the number of laminate layers tapers off gradually across a certain length. The tapering off takes place to avoid that notches show clearly and to reduce leaps in stiffness through the laminate, which effects would otherwise reduce the strength of the laminate.

It is a problem of such tapering off, however, that a tapered-off layer may loosen from the subjacent layer in the form of a delamination. Moreover, air pockets may form between the tapering-off and a superjacent laminate layer which may in turn result in wrinkling of the laminate. Both the issue of delamination and that of air pockets contribute to a weakening of the strength of the laminate object. Moreover, when using e.g. the VARTM-method, areas rich in resin may form due to the fact that, along the rim of the laminate layer, a channel is formed which may, during injection of resin, be caused to act as an undesired resin distribution channel. Those areas rich in resin are undesirable since the exothermal heat during the curing may adversely influence the curing process and the laminate. In a worst-case scenario hardening strain cracks may occur in such resin-rich areas during hardening of the resin.

EP 1 050 396 teaches a method of designing laminate objects and the disclosure shows is a laminate object that varies in thickness, wherein the variation in thickness is accomplished by the number of layers in the laminate object being tapered off. However, it does not teach any solution to the problem of delamination and the formation of air pockets and resin-rich areas.

JP08105428 teaches a tubular object composed of fibre-reinforced laminate layers. In order to reduce the risk of delamination, the tube is chamfered along an edge at the one end. Here the object is chamfered following construction of the object with laminate layers, which may involve delamination between the layers in the chamfered region. It does not teach a solution to the problem of delamination in connection with the variation in thickness and the formation of air pockets and areas rich in resin.

Thus, it is an object of the invention to provide a solution to the above-mentioned problem.

This is accomplished by a method of cutting-off laminate layers for use in a fibre-reinforced laminate object comprising a number of combined laminate layers, wherein—at least along a section of the at least one rim of the laminate layer—a tapering cut is performed through the thickness of the laminate layer, thereby gradually reducing the thickness of the laminate layer. A fibre-reinforced laminate object is generally constructed by wrapping or laying layers of webs of material atop each other. In case process methods are concerned wherein dry laminate layers are laid up, the invention relates to a method where cutting is performed in laminate layers that are not yet impregnated. However, the invention may also be used for preimpregnated webs known by the name of Prepreg. It is a common feature of all varieties (whether dry or prepreg) that the tapering cut takes place on not-hardened fibre materials. Since not only the number of laminate layers, but also the thickness of the individual laminate layers are reduced gradually, a laminate object is accomplished by which both the issues of areas rich in resin, air pockets and the risk of delamination are reduced dramatically and the strength of the finished object is increased.

According to one embodiment the laminate layer is cut taperingly through the thickness, whereby the cut will be caused to form an acute angle to a subjacent laminate layer in a laminate object; and in one embodiment the laminate layer is cut off taperingly in a concave curve. According to yet an embodiment the laminate layer is cut off in a convex curve. The shape of the curve of the cut may be determined is on the basis of stiffness conditions within the laminate layer and strains on the laminate layer. Tests have shown that a tapering cut with an acute angle and/or a cut being cut in a concave or convex curve constitute(s) an advantageous shape of curve, whereby the risk of delamination, areas rich in resin and air pockets is used considerably. The cutting procedure may take place either transversally and/or longitudinally of the laminate layers.

According to one embodiment the laminate layer is a fibre layer, e.g. glass fibre, carbon fibre or other types of fibre for plastics composites. The fibre layer or the web may consist of e.g. short, cut fibres (chopped), of fibres laid primarily on one direction (unidirectional), or of fibres laid biaxially in two directions at some angle or other in relation to each other; however, in that embodiment the fibre layer may also be woven, non-woven or stitched material. It applies in particular to such laminate layers that the problem of delamination is great and therefore a particularly effective solution to the problem is accomplished by a tapering cut according to the invention.

In a laboratory array for exercising the invention, the laminate layers are cut off by use of a tailor-made apparatus that cuts with a finger-cutting technique which is known ia fra a cattle trimmer or an ordinary hair trimmer. As it is, it has been found during work with the present invention that an entirely ordinary handheld hair trimmer may cut off the layers in a particularly convenient manner and enables a very accurate control of the cutting curve. However, obviously an industrial apparatus for cutting off laminate layers in accordance with the invention is required. Such apparatus may be constructed from elements from e.g. the carpeting industry, wherein a suitable cutting method/device is used for cutting patterns in loop and/or cut carpets.

Moreover the invention relates to a laminate layer for use in a fibre-reinforced laminate object comprising a number of combined laminate layers, wherein the laminate layer along at least its one rim is cut off taperingly down through the thickness, thereby reducing the thickness of the laminate layer.

Moreover the invention relates to a fibre-reinforced laminate object in the form of the blade of a wind turbine, wherein the blade of the wind turbine comprises a number of combined laminate layers, wherein the laminate layer is, along a section of at least its one rim, cut off taperingly down through the thickness, whereby the thickness of the laminate layer is reduced.

In the following the invention will be described in closer detail by means of figures that show exemplary embodiments of the invention:

FIG. 1 is a cross-sectional view of a laminate object structured from laminate layers in accordance with the prior art;

FIG. 2 is a cross-sectional view of a laminate object structured from laminate layers in accordance with the prior art, wherein delamination has occurred as a consequence of the tapering-off;

FIG. 3 is a cross-sectional view of a laminate layer according to the invention;

FIG. 4 is a cross-sectional view of laminate layers according to the invention with different tapering and stepped cuts;

Figure 5:
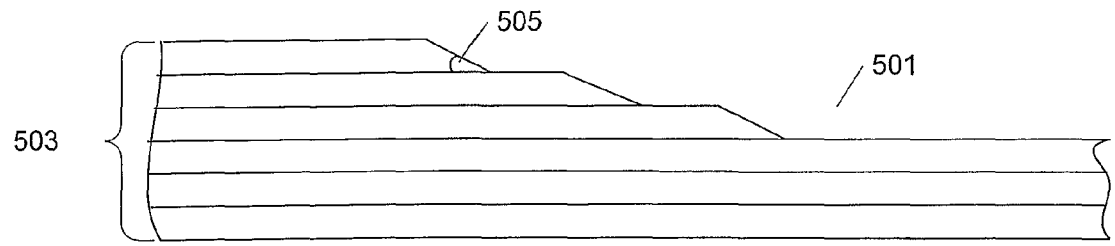
FIG. 5 is a cross-sectional view of a part of a laminate object structured from laminate layers in accordance with the invention.

FIG. 1 is a cross-sectional view of a portion of a known laminate object 101 comprising a number of combined laminate layers 103, wherein the laminate object is made thinner by a change in the number of laminate layers 103. In FIG. 1 the laminate object 101 initially comprises six laminate layers 103, and the number of laminate layers 103 is tapered off gradually to three laminate layers 103, whereby the thickness of the laminate object 101 is halved. The tapering-off takes place gradually is to avoid that notches are caused to show clearly, which would result in a weakening of the strength of the laminate object, but it may also occur to minimise the weight of the laminate in areas where the load on the laminate object is not as high. FIG. 1 also illustrates an upper layer 105 and the resin-rich areas and air pockets 107 that are formed between the upper layer 105 and the subjacent layers due to the tapering-off which may in turn result in wrinkling of the laminate surface. In order to avoid these air pockets a surplus of resin is required, in case of glass fibre laminate is concerned, which is e.g. vacuum injected underneath the upper layer 105 in order to keep the laminate layers 103 together. A further problem associated with the known laminate object is that a tapered-off layer may disengage from the subjacent layer in the form of a delamination. Both the delamination problem, the resin-rich areas and the air pockets contribute to a weakening of the strength of the laminate object, and moreover contribute to making the manufacture of laminate objects by e.g. vacuum processes, such as VARTM and the like, more difficult.

FIG. 2 is a cross-sectional view of a finished laminate (201) according to the prior art, wherein a delamination (203) in connection with the stepped tapering-off (205) is illustrated.

FIG. 3 illustrates a cross-section along a portion of a laminate layer. Here, in accordance with the invention and at the one end 303 along a section of the rim of the laminate layer 301, a tapering cut is performed down through the thickness of the laminate layer 302. Hereby the thickness 302 of the laminate layer is gradually reduced. By accomplishing such tapering cutting-off of the laminate layer, whereby not only the number of laminate layers, but also the thickness of the individual laminate layers are reduced, laminate layers result that can be used in a laminate object in which both the problems of areas rich in resin, that of air pockets and of delamination are reduced considerably.

A tapering cut is not to be construed to comprise merely a linear cutting-off illustrated in FIG. 3; rather it comprises any cut where the thickness of the laminate layer is cut off such that the thickness is reduced gradually or stepped. Examples of alternative cuts are illustrated in FIGS. 4A-4M showing how, in all cuts, the thickness of the laminate layer is cut off with different shapes of curves. One shape of curve for the cut off can be determined e.g. on the basis of stiffness conditions in the laminate layer and strains on the laminate layer.

FIG. 5 is a cross sectional view of a portion of a laminate object 501 according to the invention comprising a number of combined laminate layers 503 in accordance with the invention, wherein the laminate object is made thinner by a change in the number of laminate layers 503. Initially, the laminate object 501 has six laminate layers 503, and the number of laminate layers 503 is tapered off gradually to three laminate layers 503, whereby the thickness of the laminate object 501 is halved. In addition to a reduction in the number of layers, the thickness of the individual laminate layer 503 is also reduced by a tapering cut of the laminate layer being accomplished as shown in FIG. 3 rather than the abrupt cutting-off of the laminated layer shown in FIG. 1. In the example shown in FIG. 5, the laminate layers were cut taperingly so as to form an acute angle 505 to a subjacent layer.

Figure 6:
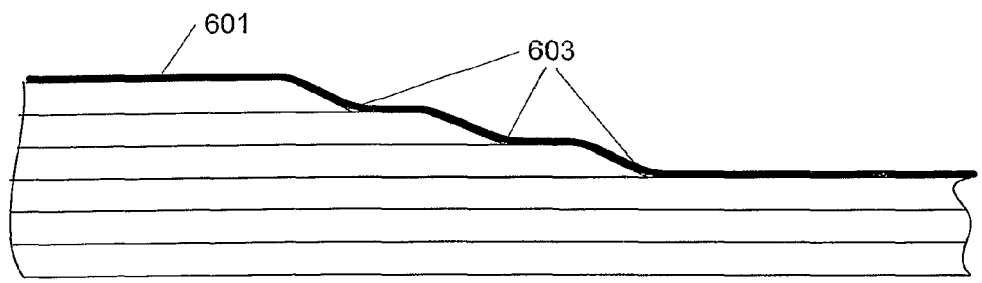
FIG. 6 is a cross-sectional view of a portion of a laminate object structured from laminate layers in accordance with the invention, on which a top coat has been applied.

FIG. 6 is a cross-sectional view of a portion of a laminate object corresponding to the laminate object shown in FIG. 5, on top of which an upper layer 601 is applied. Owing to the tapering nature of the cutting of the laminate layers, the occurrence of air pockets and areas 603 rich in resin that are formed between the upper layer 601 and the subjacent layers is minimised.

Figure 7:
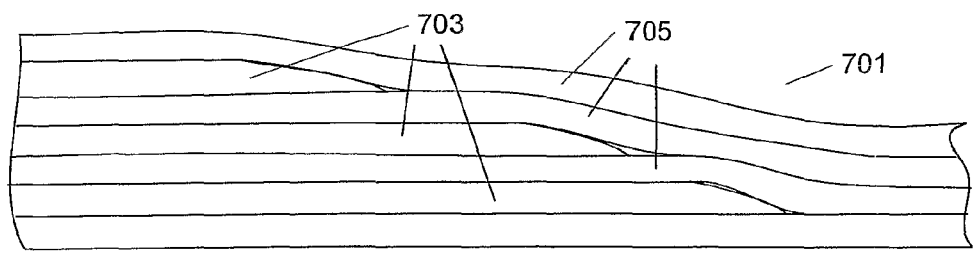
FIG. 7 is a cross-sectional view of a section of a laminate object structured from laminate layers in accordance with the invention, featuring an example of an internal tapering-off.

FIG. 7 is a cross-sectional view of a section of a laminate object 701 with internal cut laminate layers 703 that are, as will appear, cuts situated between through-going laminate layers 705. It will appear from the Figure that by this variety of the invention, too, areas rich in resin and air pockets are avoided.

Figure 8:
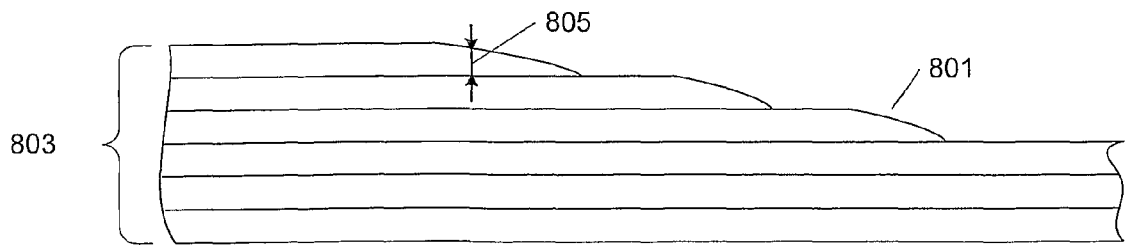
FIG. 8 is a cross-sectional view of a section of a laminate object structured from laminate layers in accordance with the invention, wherein the laminate layers are cut off taperingly as a convex curve.

FIG. 8 is a cross-sectional view of a section of a laminate object 801 according to the invention comprising a number of combined laminate layers 803 in accordance with the invention. In addition to reducing the number of laminate layers 803 the thickness 805 of the individual laminate layer is reduced, too, by the laminate layers being cut in a convex curve.

Figure 9A:
FIGS. 9A-9C are cross-sectional views of sections of laminate objects, wherein the taperingly cut laminate layer may advantageously be used in connection with joining to another object, e.g. in the context of repair.
Figure 9B:
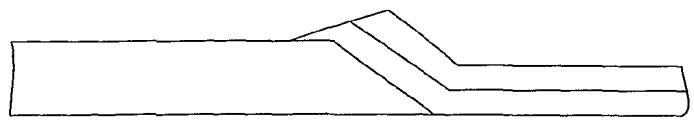
Figure 9C:
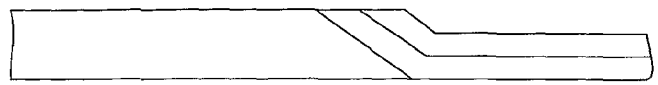

FIGS. 9A-9C show cross-sectional views of portions of laminate objects, wherein the taperingly cut laminate layer may advantageously be used in connection with the joining to another object, e.g. in connection with repair procedures. Prior art is illustrated in FIG. 9A; therein it is desired to combine a first section 901 with the laminate 903 comprising a number of laminate layers 905. Again, the abrupt cuts of the laminate layers may entail delamination and, in case an upper layer is concerned, areas rich in resin as well as air pockets may also follow. When cutting of the layers is performed taperingly as shown in FIG. 9B or 9C such problems are vitiated.

Figure 10:
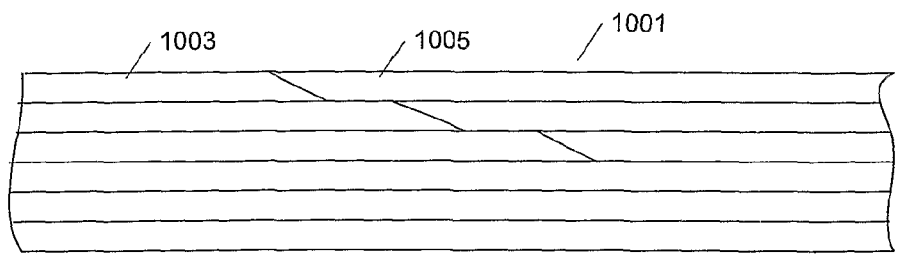
FIG. 10 is a cross-sectional view of a laminate object, wherein the taperingly cut laminate layer is used in connection with joints between laminate layers.

FIG. 10 is a cross-sectional view of a portion of a laminate object 1001, wherein the taperingly cut laminate layer can advantageously be used in connection with material transitions. Such transitions may be provided with a view to a change of material or merely to continue a laminate layer 1003 with another laminate layer 1005. By cutting off the laminate layers 1003 and 1005 in a tapering manner prior to assembly thereof, a larger gluing face between the layers is accomplished, and moreover also the risk of the laminate layers delaminating in the joints is reduced, which risk would have been higher had the laminate layers been cut off abruptly and not cut off taperingly or stepped.

Figure 11:
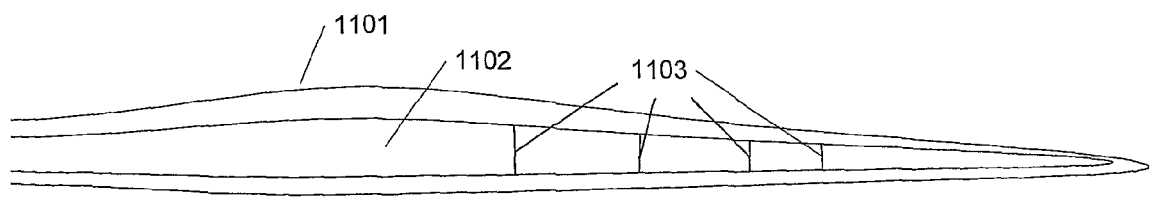
FIG. 11 shows a laminate object in the form of the blade of a wind turbine on which a tapered principal laminate is drawn.

FIG. 11 shows a laminate object in the form of a glass-fibre blade 1101 of a wind turbine. The blade 1101 of the wind turbine is constructed from glass fibre laminate layers according to the invention, whereby a blade of increased strength is accomplished, where air pockets are minimised and the risk of delamination of the glass fibre laminate object is minimised. FIG. 11 shows a part of the laminate layer of the blade illustrated as longitudinally extending panels, also called the principal laminate 1102 of the blade, by transversal lines 1103 that indicate tapering in accordance with the invention.

Figure 12:
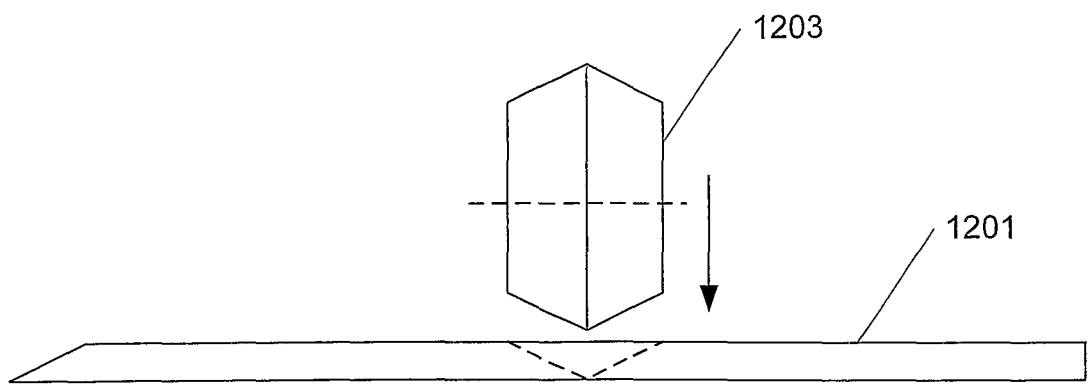
Figure 13:
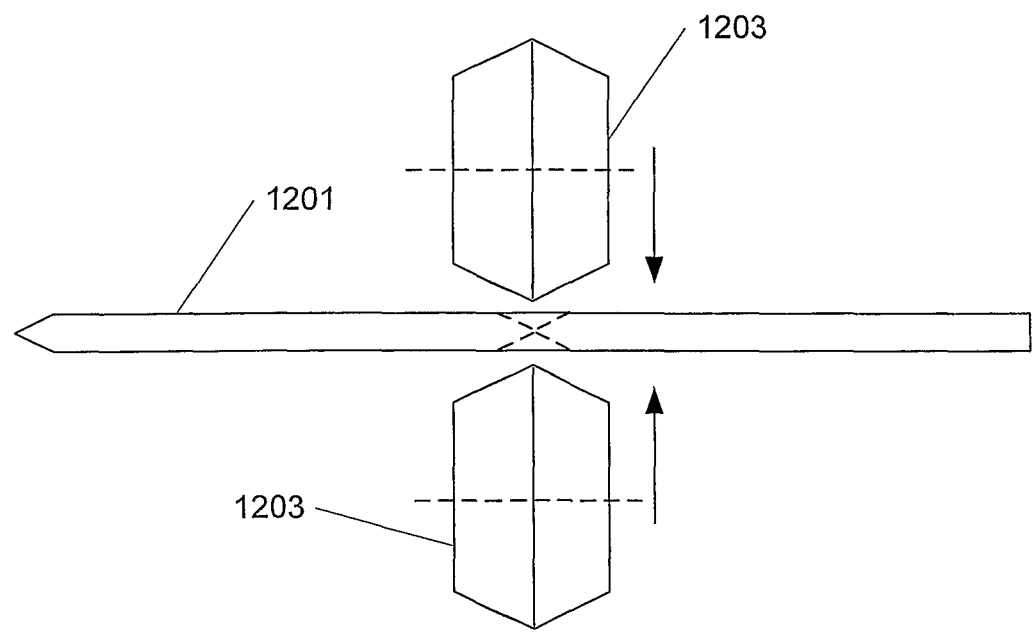

If a laminate layer in the form of glass fibre or carbon fibre is concerned, the cutting off process as such may be performed by means of an apparatus that cuts using a finger cutting technique which is known e.g. from a hair trimmer. Such apparatus may be structured from elements from e.g. the carpeting industry, wherein a suitable cutting method/device is used for cutting patterns in loop and/or cut carpets. Alternative cutting methods may, as illustrated in FIGS. 12 and 13, consist e.g. in that, in connection with the cutting of the layers 1201 by cutting unit 1203, one mills or cuts the layers through, whereby a tapering cut is achieved by use of that process. In the figures the layers 1201 are cut off by means of a rotating cutting unit 1203 which has a tapering profile thereby cutting off the laminate layer 1201 such that it tapers off. The profile of the cutting unit 1203, as shown in the figures, may taper off to one or both sides, thereby accomplishing a tapering cut of two laminate layers in one cutting process. In one embodiment the layer is cut off gradually across three centimeters.

It will be understood that the invention as taught in the present invention with figures can be modified or changed while continuing to be comprised by the protective scope of the following claims.

The invention claimed is:

1. A method of forming a fibre-reinforced laminate object, comprising the steps of:
    forming a number of non-impregnated fibre layers including an upper layer, a lower layer, and at least one intermediate layer between the upper layer and the lower layer;
    performing a tapering cut on at least a portion of at least one of the upper layer, the lower layer and the at least one intermediate layer to form a tapered layer whereby a thickness of the tapered layer is reduced; and
    applying a resin in order to combine the fibre layers and form the fibre-reinforced laminate object.

2. The method according to claim 1, wherein the taper cut forms an acute angle between the tapered layer and an adjacent layer.

3. The method according to claim 1, wherein the tapered layer is cut off in a concave curve.

4. The method according to claim 1, wherein the tapered layer is cut off in a convex curve.

5. The method according to claim 1, wherein the tapered layer is cut using a finger cutter.

6. The method according to claim 1, wherein the tapered layer is the intermediate layer.

7. The method according to claim 1, wherein the tapered layer is the upper layer.

8. The method according to claim 1, wherein the tapered layer is the lower layer.

* * * * *